United States Patent [19]

Fengler

[11] 4,211,930
[45] Jul. 8, 1980

[54] VEHICLE PROPULSION SYSTEM BY INDIVIDUAL STEPPING MOTORS FROM CONTINUOUSLY-RUNNING ENGINE-DRIVEN ALTERNATOR AND/OR PULSATING BATTERY CURRENT

[76] Inventor: Werner H. Fengler, 23651 Fordson Dr., Dearborn, Mich. 48124

[21] Appl. No.: 927,353

[22] Filed: Jul. 24, 1978

[51] Int. Cl.² .............................................. B60L 11/02
[52] U.S. Cl. ...................................... 290/15; 318/685; 290/16; 180/65 R
[58] Field of Search .................... 318/685, 696, 139; 290/15, 16, 51, 52; 180/65 R, 65 A, 65 B, 65 C

[56] References Cited

U.S. PATENT DOCUMENTS

| | | | |
|---|---|---|---|
| 3,525,874 | 8/1970 | Toy | 318/139 X |
| 3,789,281 | 1/1974 | Shibata | 318/696 |
| 3,792,327 | 2/1974 | Waldorf | 290/16 X |
| 4,119,861 | 10/1978 | Gocho | 290/51 X |

*Primary Examiner*—B. Dobeck
*Attorney, Agent, or Firm*—Willis Bugbee

[57] ABSTRACT

A constant-speed continuously-running low-powered diesel engine or turbine drives a two-phase alternator, the output from which, for direct drive, flows to the stator pole piece windings of four independently-rotating stepping motors operating synchronously with the alternator. Each stepping motor is connected to a traction wheel of a motor vehicle, thereby propelled at a limited maximum speed sufficiently to overcome normal wind resistance over a level road. In starting, during acceleration, and for propulsion at higher speeds, direct current from a storage battery is caused to pulsate and is added to the current from the alternator to the stepping motors. A control circuit selectively controls the frequency of a variable frequency generator electrically connected to the pulse-responsive electrical power system to vary the frequency of the current supplied to the stepping motors and thus vary the vehicle speed. During idling, the alternating current from the alternator is rectified and recharges the battery. During braking, the consequent driving of the stepping motors causes them to generate alternating current which is rectified and returned to the battery. By varying the frequencies of the current delivered to the right side motors as compared with those delivered to the left side motors and vice versa, in response to the turning of the steering wheel in rounding a curve in the road, a differential action is obtained.

10 Claims, 11 Drawing Figures

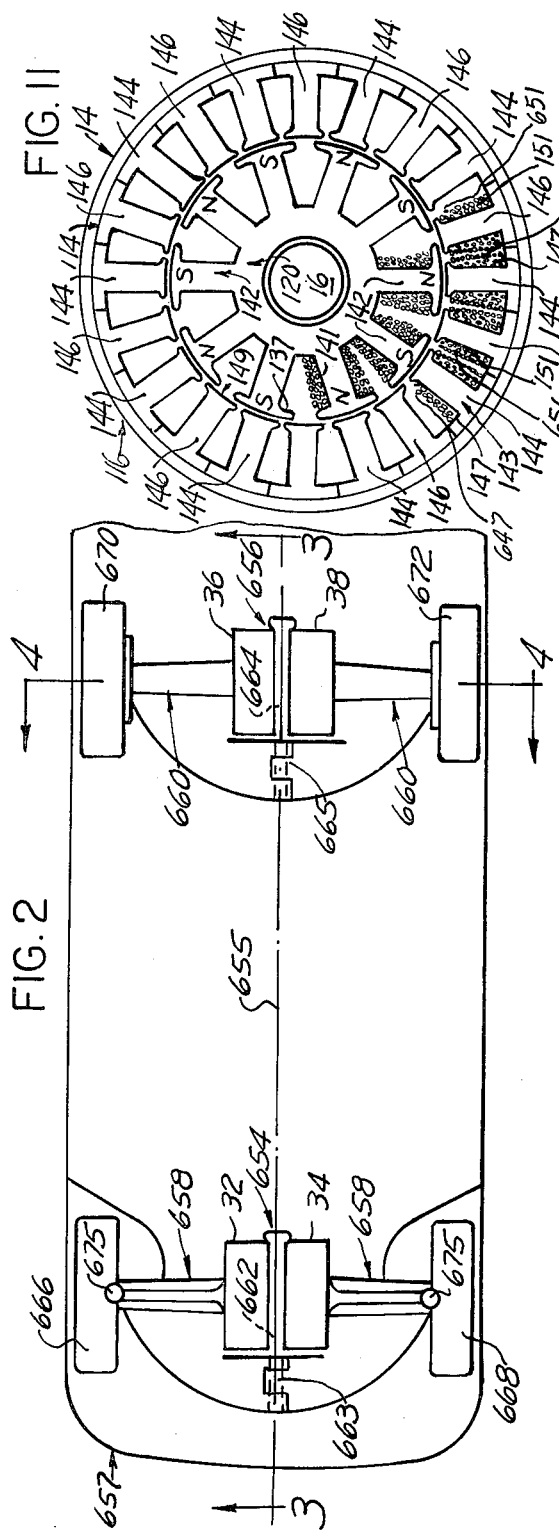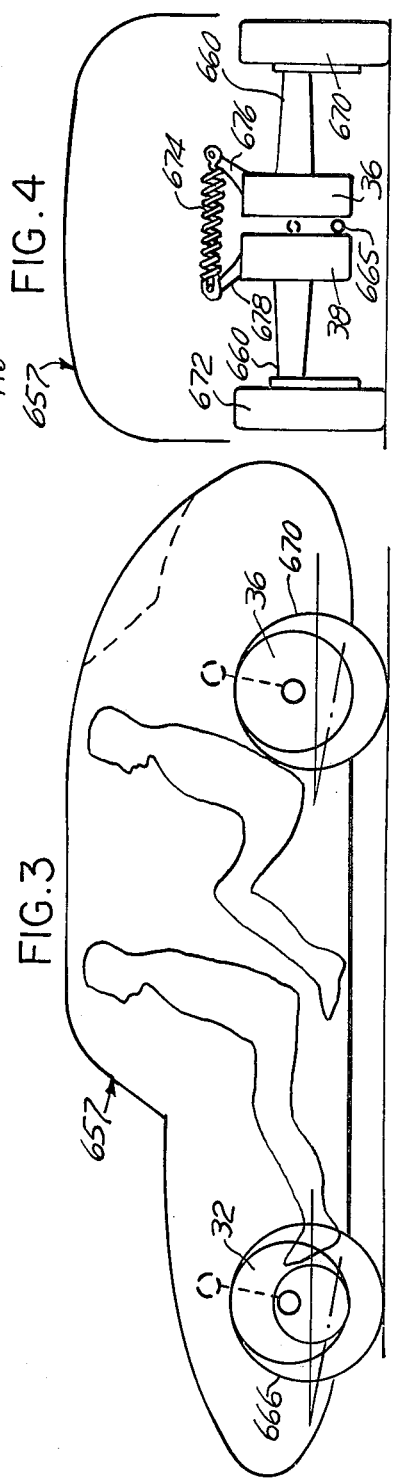

VEHICLE PROPULSION SYSTEM BY INDIVIDUAL STEPPING MOTORS FROM CONTINUOUSLY-RUNNING ENGINE-DRIVEN ALTERNATOR AND/OR PULSATING BATTERY CURRENT

BACKGROUND OF THE INVENTION

Research on fuel consumption of conventional motor vehicles driven by internal combustion engines has shown that approximately one-half of the fuel consumed by such an engine is expended and atmospheric pollution increased during starting and idling, especially during urban driving with frequent halts for stoplights and traffic. Fuel has also been wasted in such vehicles through the differential mechanism and through momentum losses by braking, not only in traffic halts but also in downhill running.

SUMMARY OF THE INVENTION

The invention principally resides in the provision of independent stepping motors individually driving the vehicle's traction wheels, as these motors are operating synchronously with a two-phase engine-driven alternator while receiving alternating current from that alternator driven by a continuously-running constant-speed internal combustion engine of considerably less power and fuel consumption than would be required for all-around propulsion of the vehicle by an internal combustion engine alone but increased, when needed, by direct current supplied from a storage battery and caused to pulsate at the proper frequency. The invention also resides in the provision of means which converts inertial energy otherwise lost in braking or free-wheeling into alternating current electricity which is rectified and returned to recharge the storage battery. It further resides in electrical means responsive to the turning of the vehicle's steering wheel for reducing the frequencies of the current supplied to the stepping motors on the inside of a road curve from those on the outside thereof, thereby providing an electrical differential.

In the drawings,

FIG. 2 is a diagrammatic top plan view of the chassis of the vehicle of FIG. 1;

FIG. 3 is a diagrammatic central vertical section along the line 3—3 through the vehicle of FIG. 2;

FIG. 4 is a vertical cross-section taken along the line 4—4 in FIG. 2;

Figure 10:
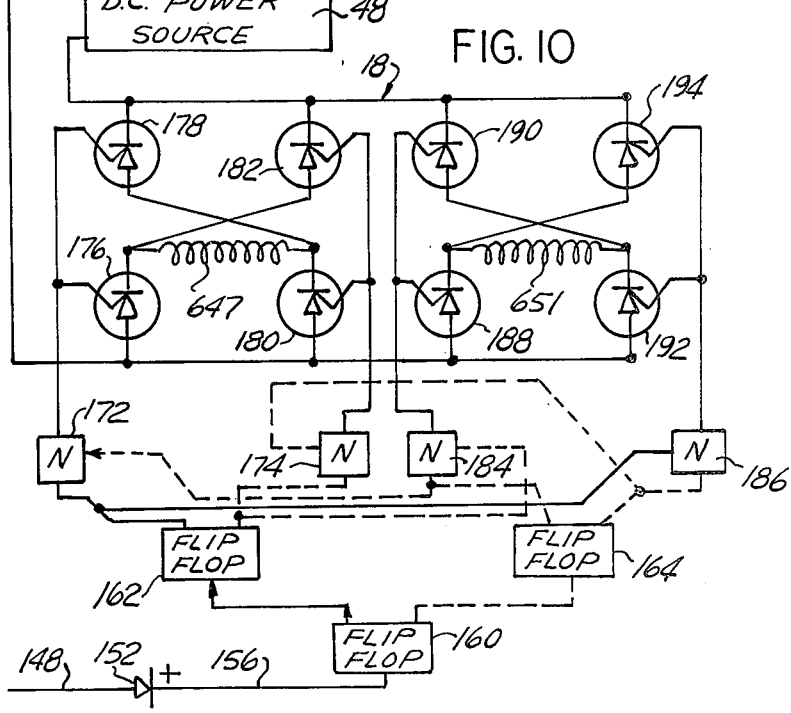
Figure 9:
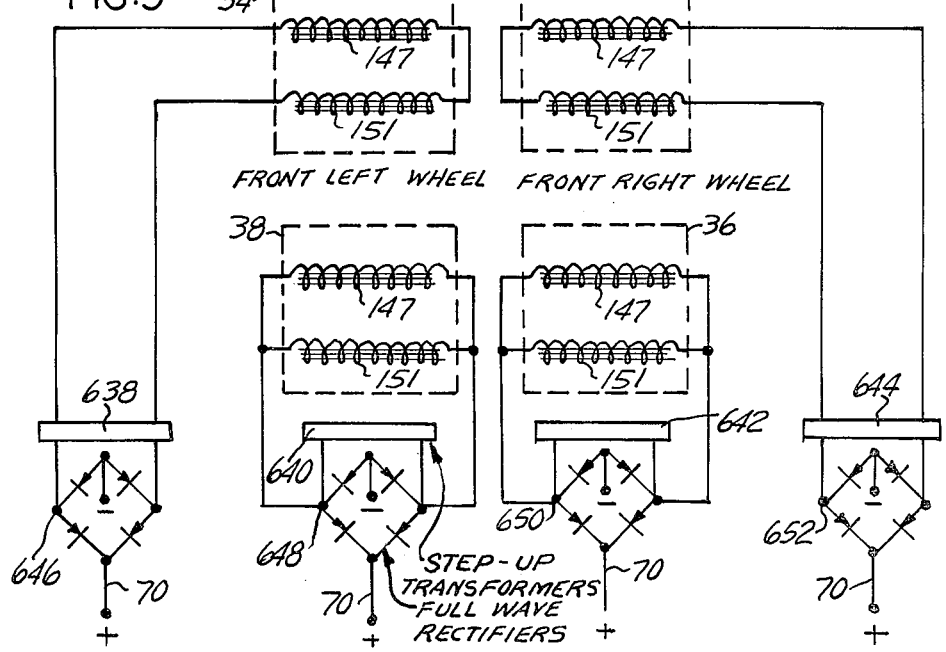

FIG. 9 shows the regenerative braking circuitry for recovering and rectifying alternating current from the vehicle wheel stepping motors acting as wheel-driven generators; and FIG. 10 is a block diagram constituting FIG. 9 of Fengler U.S Pat. No. 3,512,065 of May 12, 1970, but receiving power current from a direct current power source in the present vehicle propulsion system, and with its output to additional stator windings designated by different reference numerals; and FIG. 11 is a cross-section like FIG. 7 of my said prior patent, but showing said additional stator windings of my present stepping motors.

GENERAL ARRANGEMENT

Figure 1:
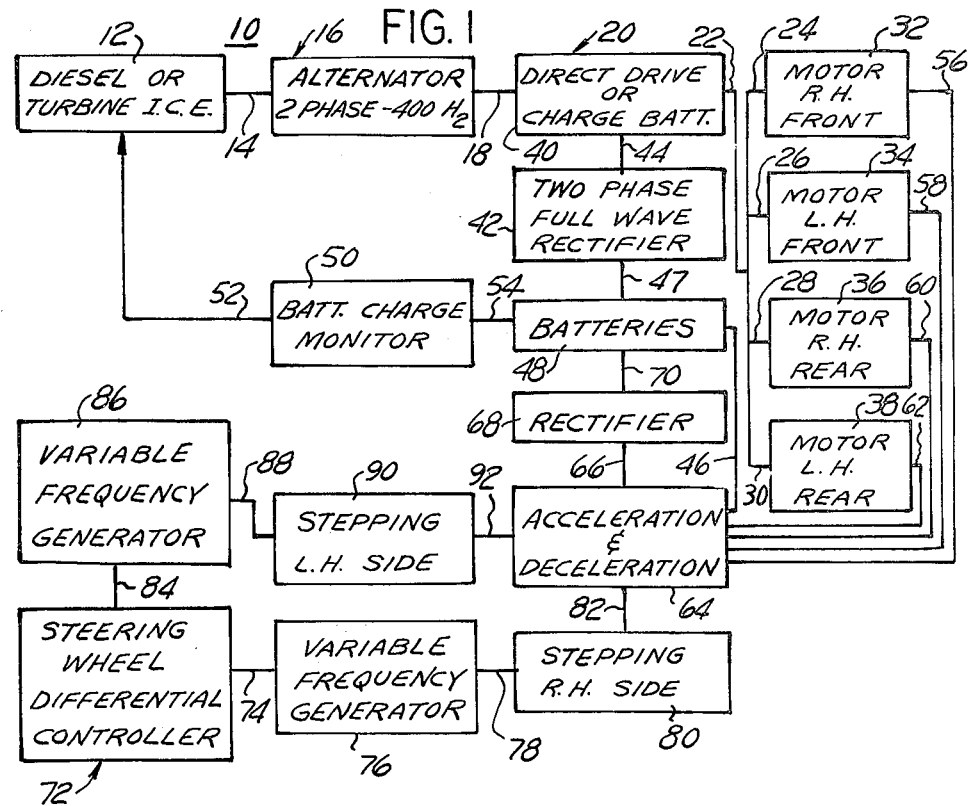
FIG. 1 is a block diagram of the stepping -motor-driven vehicle propulsion system supplied with alternating current from a continually-running constant-speed engine-driven alternator aided by pulsating direct current from a storage battery.

The block diagram shown in FIG. 1 illustrates the general arrangement of the assembled components of the stepping motor vehicle propulsion system, generally designated 10, according to the invention, the details of which are shown in detailed circuits of FIGS. 5 to 9 inclusive. The vehicle propulsion system 10 (FIG. 1), assumed to be a four-wheel driving system with independent motor driving to the individual vehicle wheels, originates with a power source 12 consisting of a continuously-running constant-speed internal combustion engine such as a Diesel engine or a gas turbine having a drive coupling 14 connecting it to a two-phase 400 cycle approximately 22 kilowatt alternator 16. From the alternator 16 the main alternating current output connection 18 proceeds through a junction 20 and an alternating current output connection 22 with branches 24, 26, 28 and 30 to the right-hand front driving stepping motor 32, the left-hand front driving stepping motor 34, the right-hand rear driving stepping motor 36 and the left-hand rear driving stepping motor 38 respectively. The driving stepping motors 32, 34, 36 and 38 are separately designated because the motors on opposite sides of the vehicle receive alternating current of different frequencies at different times to provide an electrical differential action for the vehicle when rounding curves or turning corners in the roadway. In this respect, as described more fully below, the different revolutions imparted to the right-hand motors 32 and 36 from those imparted to the left-hand motors 34 and 38 provide a corresponding action to the mechanical differential mechanism of a conventional automobile. It will be seen later that the output connection 22 and branches 24, 26, 28 and 30 carry alternating current from the alternator 16 in direct drive but also carry pulsating direct current regulated by two pulsating current frequency generators 76 and 86 described below.

From the junction 20 a two-phase full-wave rectifier 42 receives alternating current through the alternating current connection 44 and transmits it through the two-phase full-wave rectifier 42 and connection 47 to a storage battery 48, to charge the latter under the regulation of a battery-charged monitor 50 connected thereto through the connection 52 and connection 54. Braking is accomplished primarily by the motors 32, 34, 36 and 38 acting as alternators through their mechanical connections to the vehicle ground wheels and consequently alternating current through the current connections 56, 58, 60, 62 is transmitted to the regenerative braking current receiver 64 from which it proceeds through the alternating current connection 66, rectifier 68 and direct current connection 70 to the storage battery 48. A bypass connection 46 directly connects the storage battery 48 to the regenerative braking current receiver 64 around the rectifier 68 during acceleration of the vehicle to supply additional pulsating direct current to the stepping motors 32, 34, 36 and 38.

The above-mentioned electrical differential action is controlled through a steering-wheel-connected differential controller 72 which transmits signal frequency differential control regulated by turning the steering wheel through a connection 74, variable frequency generator 76, connection 78 and right-hand side stepping frequency regulator 80 through the connection 82 to the regenerative braking current receiver 64 and through the connection 84, left-hand variable frequency generator 86, 88, left-hand side stepping frequency regulator 90 and connection 92 to the regenerative braking current receiver 64. From the latter signals proceed by way of the connections 56, 58, 60 and 62 to the right-hand stepping motors 32 and 36 and left-hand stepping motors 34 and 38 at different frequencies, depending upon the direction and amount of turn as governed by the differential controller 72 operated by the vehicle steering wheel. The term "connection" may consist of a single line or a plurality of lines, as explained in connection with FIGS. 5 to 9 inclusive. A variable frequency generator is described and its circuitry shown in "NASA Tech Briefs, Winter 1976" published by the Lyndon B. Johnson Space Center for work done by Michael J. Allen at Martin-Marietta Corporation for Johnson Space Center, MSC-16331.

POWER SOURCE

The power source 12 for driving the alternator 16 through a mechanical connection 14 may consist of a conventional internal combustion engine, such as a Diesel engine or gas turbine, either of which is smaller than is ordinarily necessary in a conventional motor vehicle which requires such a power source to propel the vehicle from a standstill through acceleration to a high speed, as well as in idling. The power delivered by the power source 12 needs only to be sufficient to drive the alternator 16 to produce an output therefrom adequate to enable the stepping motors 32, 34, 36 and 38 to overcome the wind resistance and road friction encountered by the vehicle in level road operation.

The advantage of this constant speed of the Diesel or gasoline engine or gas turbine is that it operates at a much higher efficiency than an engine which is required to accelerate and decelerate, as in vehicles propelled directly by conventional internal combustion engines or turbines. Moreover, the emissions produced by such constant-speed engines are very low in contrast to the high emissions produced by variable speed engines. In addition, the constant speed engine gives a much better fuel economy than an engine which is called upon to accelerate and decelerate repeatedly during operation. It is a wellknown matter of fact, for example, that the efficiencies of internal combustion engines running continuously at constant speed to drive electrical generators in generating plants is nearly twice that of the best internal combustion engines used in the present-day automobile.

The alternator 16 driven by the power source 12 is a two-phase alternator with an output preferably of 120 amperes in each phase operating continuously at a maximum frequency of 450 cycles per second at a voltage of 60 to 84 volts with the two phases 90 degrees apart. This gives enough electrical output to overcome the wind resistance and rolling resistance of the vehicle in direct drive, with the output of alternating current delivered directly to the stepping motors 32, 34, 36 and 38 directly connected to each of the individual vehicle wheels. The alternator 16 employed in the vehicle propulsion system 10 of this invention must operate at a sufficiently low speed in revolutions per minute in order to fit the torque curve of a Diesel engine, if so powered. The frequency should be variable between 300 and 450 cycles per second depending upon the revolutions per minute of the power source 12 to which the alternator 16 is coupled. It will be understood, however, that if this required frequency can be more economically or efficiently produced through an alternator 16 having a higher speed in revolutions of its rotor, a small turbine may be used as the power source 12 in place of the Diesel engine.

The minimum current output of the alternator 16 would preferably be 20 kilowatts with each of the two phases thereof producing an output of 120 to 170 amperes. While the desired voltage produced by the alternator 16 is between 60 and 84 volts, under special circumstances 120 volts would be preferable inasmuch as 120 volts is the voltage used by the aircraft industry in aircraft electrical systems.

The output of the alternator 16 provides alternating current to be used in driving each wheel by its individual stepping motor 32, 34, 36 or 38 independently through a special solid state control circuit described below. Operation of its two-phase alternator at approximately 400 cycles per second is required because the special stepping motor 32, 34, 36 or 38 described below has a stator with only two rotating but separate magnetic fields. As more fully set forth and described and claimed in my prior U.S. Pat. No. 3,513,065 issued May 12, 1970 for HighTorque Stepping Motor-Driven Speed-Reducing prime mover, one such field attracts the nearby magnet of the rotor, if this magnet is of the opposite polarity, while the second field repels that nearby magnet of the rotor if that magnet is of the same polarity.

As will be seen below in connection with the operation of the invention, in the "direct drive" operation of the invention, the stepping motors 32, 34, 36 and 38 are locked into synchronization with the alternator 16, without slippage, hence the alternator 16 must produce a two-phase alternating current to drive this particular type of motor. The vehicle propulsion system 10 (FIG. 1) can therefore be considered as propelled by electronically-commutated stepping motors 32, 34, 36 or 38 which are also capable of operating from an alternating current power supply 16 wherein the frequency and phase of the stator currents are regulated through the variable-frequency generators 76 and 86 and siliconcontrolled rectifiers (FIG. 5) to maintain the magnetic fields at their maximum torque conditions, independent of rotor speed or current frequency supplied. In this manner, the stepping motors 32, 34, 36 and 38 of the vehicle can operate over a wide range of speeds while supplied with alternating current from the fixedfrequency two-phase alternator 16.

The storage battery 48 employed in the vehicle propulsion system 10 (FIG. 1) needs only to be sufficiently large to assist the output of the alternator 16 driven by the small continuouslyrunning constant-speed engine 12 during starting and acceleration, the direct current from the storage battery 48 being electronically commutated by the variable frequency generators 76 and 86 to deliver direct current pulses at the desired frequencies to the stepping motors 32, 34, 36 and 38. While the vehicle is standing still, the engine or turbine 12 does not slow down and idle but continues to run at constant speed so that the rectified output of the alternator 16 is then used to charge the battery 48. It will also be seen below (FIG. 9) that a regenerative braking system 64 has been provided which, during braking operation, employs the stepping motors 32, 34, 36 and 38 as generators supplying current which when rectified recharges the battery 48.

SOLID-STATE CONTROL SYSTEM FOR OUTPUT OF FIXED-FREQUENCY TWO-PHASE ALTERNATOR

Figure 5:
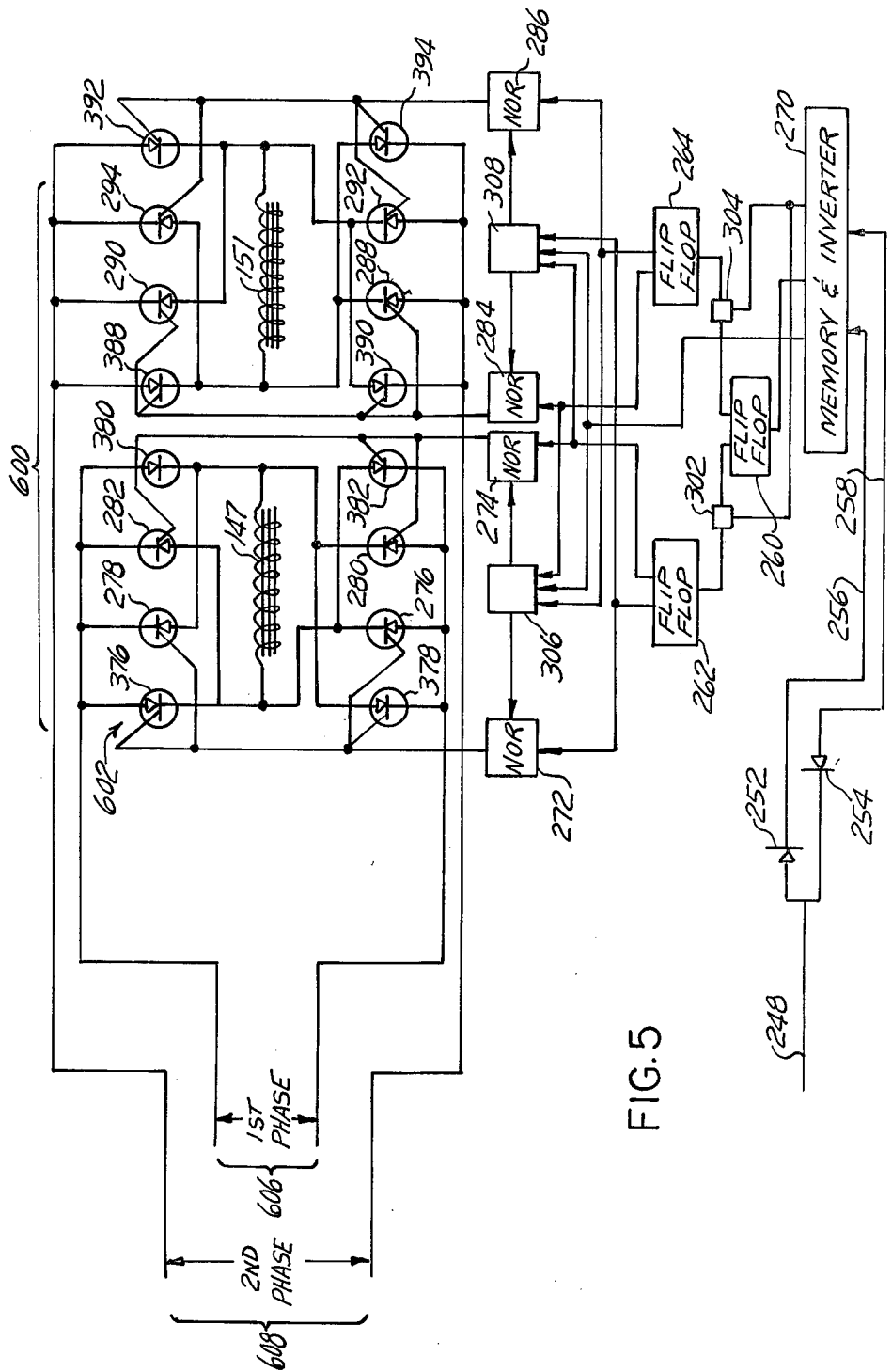
FIG. 5 is a circuit diagram of the two-phase electrical system involved in the propulsion of the stepping motor of FIG. 1.

In FIG. 5 there is shown the solid-state control system, generally designated 600, which supplies full-wave direct current from the two-phase alternator 16 to energize and control the stepping motors 32, 34, 36 and 38 of FIG. 1 for bidirectional rotation of the vehicle wheels. FIG. 5 thus represents the change in the full-wave circuit 220 in FIG. 26 of my abovementioned previous U.S. Pat. No. 3,512,065 to adapt it to the reception of the two-phase output from the two-phase alternator 16 herein. Use is made in FIG. 5 herein of the same reference numerals from 147 to 382 for corresponding parts as in FIG. 26 of my previous U.S. Pat. No. 3,512,065 of May 12, 1970 for the convenience of those skilled in the art, and who are hereby referred thereto in order to avoid apparently needless repetition and duplication of description. Furthermore, since the reference numerals in my said previous U.S. Pat. No. 3,512,065 end at 568, to avoid any possible confusion the reference numerals used in the remainder of the present specification and drawings start at 600 and remain thereabove.

From FIG. 5 it will be seen that the present circuit 600 is generally similar to the circuit 220 of my said prior U.S. Pat. No. 3,512,065 but divided into different portions because of the twophase alternating current representing the output of the two-phase alternator 16 rather than the single-phase alternating current input or current supply source in my said prior U.S. Pat. No. 3,512,065. For a detailed description of the elements of the circuit 600 shown in the present FIG. 5 and the generally similar circuit 220 in FIG. 26 of my said U.S. Pat. No. 3,512,065, reference is made to my latter prior specification.

In my improved circuit 600 (FIG. 5) a sub-circuit makes use of the left-hand upper half, renumbered 602 of my patent circuit 220 for receiving the output 606 of the first phase of the alternator 16, whereas an additional sub-circuit corresponding to the right-hand upper half, renumbered 604, receives the output 608 of the second phase thereof. The entire circuit 600 provides for a separate transmission of electrical energy to the stepping motors 32, 34, 36, and 38 by the provision of pulses of direct current to the two stator circuits for each wheel, each circuit creating alternate north and south poles. In particular, the output of the first phase 606 of the alternator 16 is connected to the first group 602 of silicon-controlled rectifiers 276, 278, 280, 282, 376, 378, 380 and 382, which supply current to the stator windings 147 of the stepping motors 32, 34, 36 and 38, whereas the second group 604 of silicon-controlled rectifiers 288, 290, 292, 294, 388, 390, 392, 394 receive the output of the second phase 608 of the alternator 16 from the connections 604 thereof and supply direct current pulses to the second stator winding 151 of each such stepping motor. The proper timing of these pulses to stator windings 147 and 151 requires an adjustment of the times the "delay lines" retard the shut-off impulses over the reed switches 306 and 308 to the "NOR" logic modules 272, 274, 284, 286.

As stated above, in order to achieve the desired great savings in petroleum fuel, the power plant 12 of the present invention is undersized and insufficient to enable the vehicle to accelerate at a needed rate, for instance, to enter high speed traffic lanes safely on expressways or to ascend steep grades. It is therefore necessary to boost the output of the stepping motors 32, 34, 36 and 38 during acceleration and on grades to more than double their output in "direct drive". To accomplish this (FIGS. 10 and 11) third and fourth windings 647 and 651, in addition to the windings 147 and 151, are provided on alternate stator pole pieces 144 and 146 of stepping motors 32, 34, 36 and 38. These additional third and fourth windings 647 and 651 are fed pulsating direct current impulses from the storage battery 48 by using, in FIG. 10, a slight modification of the wiring diagram shown in FIG. 9 of my above-mentioned U.S. Pat. No. 3,512,065 wherein the block 20 labelled "A.C. Power Source" is replaced by "D.C. Power Source", namely the storage battery 48. To this circuit is added the "commutating capacitors" necessary to temporarily shut off the silicon-controlled rectifiers and their network, as described for example in the book published in 1974 by International Rectifier Semi-Conductor Division, 233 Kansas St., El Segundo, California. See therein chapter 9, entitled "Chopper Power Circuits", particularly FIGS. 19-21 on page 327 thereof. In this manner, a square wave output is supplied to the stepping motors 32, 34, 36 and 38, aided in starting and accelerating by direct current from the storage battery 48 caused to pulsate at the proper frequency as controlled by the variable frequency generators 76 and 86. For forward motion of the vehicle, the positive half of the square wave is used while the negative half thereof is suppressed. When the vehicle is to travel in a reverse direction, such as in backing, the positive half of the square wave is suppressed and only the negative half is supplied to the line 248.

Figure 6:
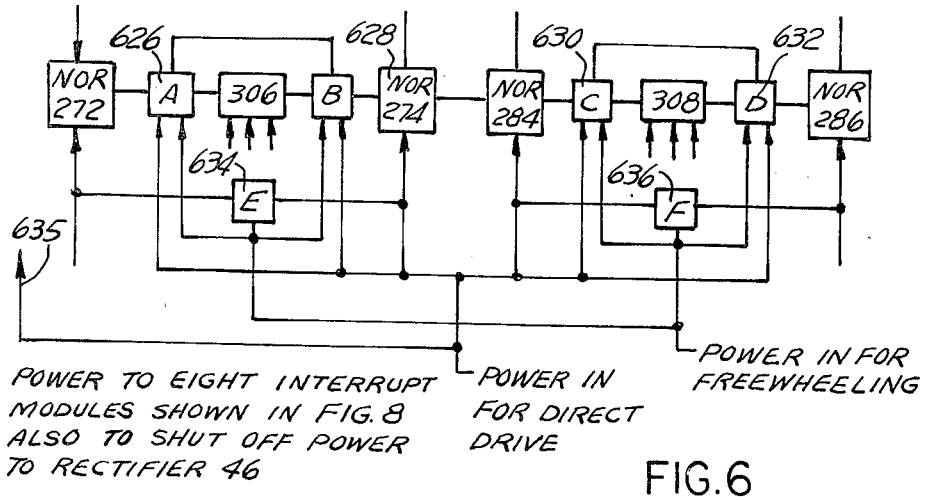
FIG. 6 is a logic circuit diagram employed in direct drive or free-wheeling of the vehicle of this invention.
Figure 8:
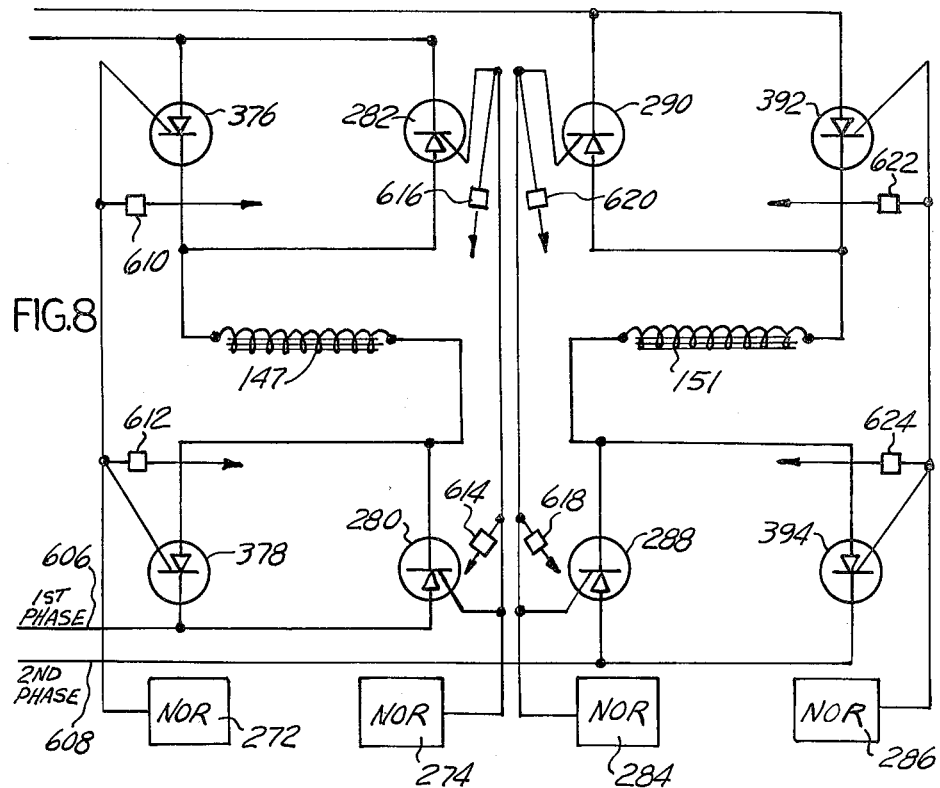
FIG. 8 is a logic circuit diagram for the two-phase alternating current emitted from the alternator and rectified by silicon-controlled rectifiers.

When the vehicle attains a speed of 44 to 45 miles per hour, the circuitry shifts over to direct drive of the stepping motors 32, 34, 36 and 38 by the alternator 16, as shown in FIGS. 6 and 8, which locks each of the stator windings 147 and 151 directly in synchronism with the alternating current output of the alternator 16. In FIG. 8, the designation 147 designates the first set of pole piece windings of each stepping motor in series, whereas 151 designates the second set of pole piece windings in series. The four additional "NOR" modules 610, 612, 614, 616 when energized through the line 635 (FIG. 6) will shut off the silicon-controlled rectifiers 276, 278, 380, 382 in the first phase 606, but the remaining silicon-controlled rectifiers 280, 282, 376 and 378 will connect the motors 32, 34, 36 and 38 directly to the first phase of the alternator 16 when in "direct drive". The remaining four additional "NOR" modules 618, 620, 622 and 624 will shut off the silicon-controlled rectifiers 292, 294, 388 and 390 in the second phase 608, but the remaining silicon-controlled rectifiers 288, 290, 392 and 394 will connect the motors 32, 34, 36 and 38 directly to the second phase of the alternator 16 when in "direct drive". Now the stepping motors 32, 34, 36 and 38 are operating as synchronous motors, but this can only happen when the speed of the vehicle has reached the minimum constant speed of the alternator 16 and the phase of the motors is in step with the alternator. Otherwise the reference numerals in the FIGS. 6 and 8 correspond to those in FIG. 26 of my said prior U.S. Pat. No. 3,512,065.

LOGIC CIRCUITRY FOR PLACING ALL WHEELS IN DIRECT DRIVE OR FREE-WHEELING

In order to extend the logic circuitry of FIG. 5 to cause the logic circuits thereof to enable the placing of all four traction wheels of the vehicle either in a direct-drive condition or in a free-wheeling condition, the logic circuit shown in the lower half of FIG. 5 has been modified in FIG. 6 by adding six reed switches 626, 628, 630, 632, 634 and 636. Four of these additional reed switches, namely the reed switches 626, 628, 630 and 632 are normally closed and when not energized let current run from the reed switches 306 and 308 of the "NOR" modules 272, 274, 284 and 286 which normally remain in the stepping condition.

When, however, the vehicle is in a "direct drive" condition, and when electric power is directed to the four reed switches 626, 628, 630 and 632, they interrupt the four lines so that any current which would otherwise come through the reed switches 306 and 308 is now interrupted. The effect of this occurrence is that the "NOR" modules 272, 274, 284, 286 stay in a conducting condition regardless of which side of the flip-flops 262 and 264 is conducting. Because these "NOR" modules are not interconnected through two additionally normally-open reed switches 634 and 636, all "NOR" modules will conduct without interruption and all stepping motors 32, 34, 36 and 38 will become directly connected to the two-phase alternator 16 (FIG. 1).

On the other hand, when free-wheeling is desired (FIG. 5), the power to the four additional reed switches 626, 628, 630 and 632 connects the two sides of the reed switches 306 and 308 so that whatever output of the flipflops 262 and 264 happens to be "on", that output is also conducted through to the "NOR" modules, thereby interrupting the conducting condition of all four of the "NOR" modules 272, 274, 284 and 286. With the circuitry in this condition, the gates of all silicon-controlled relays are without current, so that no current can flow through to the stators of the stepping motors 32, 34, 36 and 38.

REGENERATIVE BRAKING ACTION

In the circuit shown in FIG. 26 of my above-mentioned prior U.S. Pat. No. 3,512,065, two "NOR" modules are in a conducting condition in their stepping arrangement, namely "NOR" modules 272, 284, 274 and 286, such conducting being in sequence when stepping is occurring in a forward direction but in a reverse order when stepping is occurring in a reverse direction. When a step is completed, however, the power from the flip-flops 262 and 264 is also conducted through the two reed switches 306 and 308 and through the delay lines between these reed switches, the prior activated "NOR" module is shut off through the succeeding impulse, thereby permitting only one "NOR" module to conduct, namely the last "NOR" module which is in stepping condition. This occurrence produces a holding force in the half circuit of the stator of the motor 32, 34, 36 or 38, without starting the next step.

Should the next step be slower than the previous sequence of steps, the rotor of the particular stepping motor 32, 34, 36 or 38 will be subjected to a stronger retardation through the holding force. Should the vehicle go faster than the impulses arriving on line 248 (FIG. 5), that holding force will be overcome and the particular motor 32, 34, 36 or 38 will then act as an alternator as well as a brake. Either of the stators with windings 147 or 151 will now produce a braking force upon the traction wheel of the vehicle. Should this braking force still not be sufficient and the impulses arriving in line 248 (FIG. 5) go down to zero speed, then the stator windings 147 and 151 of either front wheel 32 or 34 will be first connected in parallel and then in series, as shown in FIG. 9. By this series arrangement the output of the stepping motors is increased and the maximum braking force consequently created.

The stator windings 147, 151, 647 and 651 of the rear wheel stepping motors 36 and 38 are connected in parallel, however, because the braking effort at the rear of the vehicle must be less than that occurring at the front of the vehicle. As shown in FIG. 9, all of the four groups of stator windings 147 and 151 are connected individually to four adjustable step-up transformers 638, 640, 642 and 644 to raise the generated output voltage to be always higher than the voltage of the storage battery 48. This generated and transformed alternating current voltage then passes through four full-wave rectifiers 646, 648, 650 and 652 of the rectifier assembly 68 (FIGS. 1 and 9). The output of these rectifiers is preferably returned to the storage battery 48 through the connection 70 by way of an adjustable rheostat (not shown), thereby controlling the maximum braking force of each motor 32, 34, 36 or 38. This arrangement not only prevents skidding and the pulling to one side of the street or road but also (FIG. 9) results in the addition of four levels of braking force available, not counting the free-wheeling condition. In a truck or tractor-trailer combination vehicle, more motors and controls are thereby available for the possible preventing of "jack-knifing". However, in this latter arrangement, sensors for the slipping and consequent stalling of the traction wheels during braking must be provided.

ELECTRONIC DIFFERENTIAL SYSTEM

Figure 7:
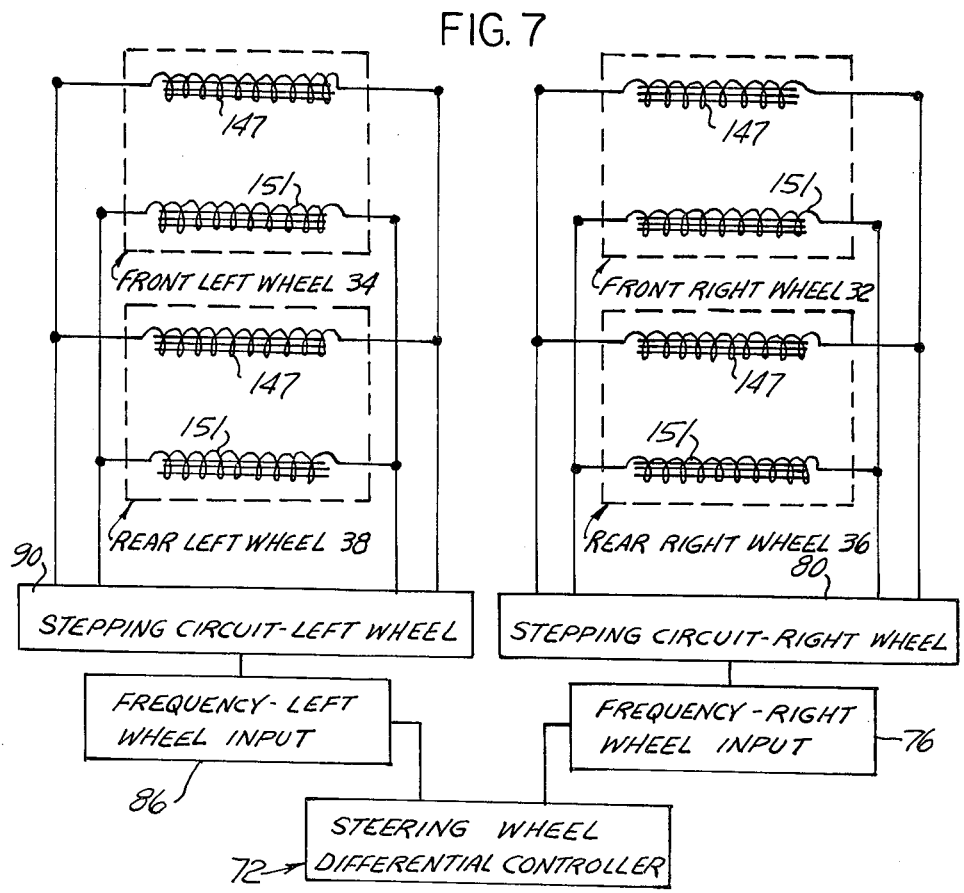
FIG. 7 is a circuit diagram of the variable frequency differential action obtained in rounding a curve in the present vehicle.

In FIGS. 1 and 7 are shown the arrangement for providing electronically a differential performance of the vehicle wheels on opposite sides of the vehicle corresponding to the action of a mechanical differential mechanism in a conventional motor vehicle. FIG. 7 also uses the same reference numerals as FIG. 5 and as FIG. 26 in my said U.S. Pat. No. 3,512,065. In order to perform a turn, such as in rounding a curve in the roadway or turning a corner, the wheels on the opposite sides of the vehicle must necessarily be traveling at slightly different speeds. According to the present invention, this electronic differential is governed by the steering gear 92 of the vehicle. Depending on the rolling radius of the tires and the angle of the steering arm to the right or to the left, the variable frequency generator 76 or 86 for the right-hand or left-hand side respectively causes the frequency of the square wave signal being fed into the line 248 (FIG. 5) to be slowed down if on the inside of the curve or corner while at the same time the wheels on the outer side of the curves are turning more rapidly as goverened by the higher frequency of their respective stepping motors. When the vehicle is travelling in a straight-forward direction, however, the frequencies from the variable frequency generators 76 and 86 are of course equal.

CHASSIS SUSPENSION FOR STEPPING MOTORS OF THE VEHICLE

The preferred front and rear suspensions 654 and 656 of the stepping motors 32, 34, 36 and 38 in a typical vehicle chassis 657 are shown diagrammatically in FIGS. 2, 3 and 4. The suspension 654 or 656 consists of two spot-welded front and rear suspension arm assemblies 658 and 660 which are hinged at front and rear at 662 and 664 on the center line 655 of the vehicle. The pivot axis 662 or 664 of this hinge is preferably higher in front than in the rear, so that if and when the wheels hit an obstruction or pothole, they can move somewhat backward on the upstroke thereof. Such action softens the impact, because the center line drops below the centers of the wheels and consequently prevents scuffing and uneven wear on the tires. The stepping motors, 32, 34, 36 and 38 for the traction wheels 666, 668, 670 and 672 respectively (FIG. 2) are fastened to the extension arm assemblies 658 or 660 and pivot around the same pivot axis 662 or 664 on the center line 655 of the vehicle 657. The distance at the top between the housings of the two adjacent motors 32 and 34 or 36 and 38 is so dimensioned that the axle will encounter the chassis frame (not shown) ahead of the housing, thereby taking up the play allowed. In the downward stroke, however, the axles are limited in their travel by shock absorbers (not shown). A heavy duty compression spring 674 (FIG. 4) connected between upstanding arms 676 and 678 on the housings of the motors 32 and 34 or 36 and 38 eliminates the need for front and rear sway bars because the compression spring 674 acts in the same manner. The pivot axes 662 and 664 of the hinges 663 and 665 are eccentric and thereby allow adjustment for the toe-in of the front and rear axles of the front and rear suspensions 654 and 656 respectively.

Depending on the chosen torque output of the motors, the center line of the motor can lie higher than the center line of the wheels and the spur gear on each wheel would achieve a mechanical advantage. The motors 32 and 34 for the front axle are fastened to the suspension arm assembly 654 but would each have a conventional constant velocity universal joint 675 so as to permit the kingpin to have the required inclination for camber and caster.

By being anchored at the top of the apron, the kingpin would swing practically vertically and not in a circular arc like the rear wheel. Each such hinge 663 or 665 (FIGS. 2 and 4) is anchored at front and rear to the chassis frame and all of the wheels swing around the correspondingly low hinge axis 662 or 664 on a swinging arm assembly 658 or 660 that is much longer than those in present production practice. As a result of the above-described construction, the ride of the vehicle 657 is improved and any side sway is eliminated.

Summarizing the present invention, the block diagram of FIG. 1 and FIGS. 2, 3 and 4 show an electrical train 10 for independently driving each wheel 666, 668, 670 and 672 of the vehicle 657 and for braking each such wheel separately. Direct drive supplies alternating current from the alternator 16 either directly to the stepping motors 32, 34, 36 and 38 or through the two-phase full-wave rectifier 46 to the storage battery 48. The charge monitor 50 shuts off the internal combustion engine 12 when the battery 48 is fully charged or when it begins to develop gassing, which indicates that the battery 48 is almost fully charged and would be damaged if overcharged.

OPERATION

To start the vehicle from a standstill, the operator by means of the accelerator pedal (not shown) orders the differential controller 72 (FIG. 7) to start sending positive stepping signals or pulses from the right-hand or left-hand variable frequency generators 76 and 86 through the stepping controls 80 and 90, thereby energizing these controls so as to send electric current to the stators of all four motors 32, 34, 36 and 38. This differential controller 72 is connected to the conventional steering control arm (not shown) of the front wheels of the vehicle by means of a position sensor (not shown) which indicates if a differential speed should exist between the right-hand and left-hand set of wheels.

The speed of outgoing stepping signals or pulses is controlled through a conventional accelerator pedal which, when depressed, sends a lower or a higher voltage to the variable frequency generators 76 and 86.

When the vehicle has reached the speed of approximately 45 miles per hour, the "direct drive control" (FIGS. 5, 6 and 8) connects all motors 32, 34, 36 and 38 to the two-phase alternator 16 so that all these motors run at the same speed as the alternator 16 in a synchronous relationship. In this "direct drive" condition of operation, no current is drawn from the battery 48, hence the vehicle upon long trips is independent of the size of the battery. When the position of the accelerator pedal signals a slowing down of the speed to the stepping motors 32, 34, 36 and 38, the revolving magnetic field in each stator thereof also slows down, with the result that the rotor thereof also attempts to slow down, consequently slowing down the vehicle 657. Should the position of the accelerator pedal indicate zero speed, namely a halt of the vehicle, and thereby lock the magnetic fields of the stators of the stepping motors 32, 34, 36 and 38, the permanent magnets in the rotor of each of said motors will generate an alternating current in each stator. This alternating current is rectified in the regenerative braking rectifier 64, 68 as described above, and returned to the storage battery 48 to recharge the latter.

Conventional hydraulic four-wheel disc brakes are preferably retained in this vehicle 657 to serve as additional safety brakes. Furthermore, in a tractor trailer combination, if a stepping motor of the type herein described is provided for each wheel of the tractor and for all wheels of the trailer, it is possible to drive such a tractor-trailer combination in the same manner as an electric interurban train where each axle group has its own electric motor, and a single controller controls all motors. Finally, as there is unused space beneath such a trailer chassis, a large storage battery can be conveniently installed in that space. As a consequence, a smaller tractor is thereby able to haul a larger load and, at the same time, a similar saving of petroleum fuel is achieved by charging the battery from an electric public utility energy outlet at each terminal station.

I claim:

1. An engine-driven-alternator individual-wheel-motorized electric propulsion system for a four-wheel motor vehicle provided with a steering mechanism, said system comprising an engine-driven two-phase alternator having a two-phase alternator output, a plurality of electric stepping motors adapted to be drivingly connected one to each vehicle wheel and having motor inputs, each stepping motor having a rotor and also having a stator with a multiplicity of pole pieces arranged in first and second sets disposed in alternate sequence with the pole pieces of each set having alternate opposite windings imparting alternate opposite polarities to the stator pole pieces of each set upon energization thereof,
- each stator pole piece having a first winding adapted to be energized by pulses of rectified alternating current and a second winding thereon adapted to be energized by pulses of direct current, a storage battery, a pulse-responsive electric power system including a plurality of gate-controlled rectifiers having power current input means and also having power current output means, a stepping motor control circuit interposed between and connecting said alternator output to said motor inputs and including switching means connected to the gates of said gate-controlled rectifiers and responsive to the reception of positive or negative pulses for selectively energizing said first and second windings of said stator pole pieces separately and simultaneously and thereby effecting step-by-step rotation of said rotors, variable frequency generating means electrically connected to said pulse-responsive electric power system including said plurality of gate-controlled rectifiers, and a frequency control circuit for selectively controlling the frequency output of said variable frequency generator means.

2. An engine-driven-alternator individual-wheel-motorized electric propulsion system, according to claim 1, wherein said variable frequency generating means includes a right-turn variable frequency generator and a left-turn variable frequency generator connected in frequency-regulating relationship to the right side and left side stepping motors respectively, and wherein there is provided a variable frequency generator control device connected to the vehicle steering mechanism and responsive to the operation thereof to effect differential variation of the frequency of electric current supplied to and proportioned between said right side and left side stepping motors.

3. An engine-driven-alternator individual-wheel-motorized electric propulsion system, according to claim 1, wherein engine control means is provided regulating the speed of said engine and alternator to rotate at a substantially constant speed and constant alternating current frequency output respectively.

4. An engine-driven-alternator individual-wheel-motorized electric propulsion system, according to claim 3, wherein the vehicle is provided with an operator-actuated vehicle speed regulator, wherein the output of said alternator is connected to said first windings of said motor stators, and wherein said switching means connects alternator-synchronized pulsating direct current from said storage battery to said second stator windings in response to a power demand for the attainment of a predetermined vehicle speed or acceleration.

5. An engine-driven-alternator individual-wheel motorized electric propulsion system, according to claim 1, wherein said gate-controlled rectifiers include a first set of full-wave first-phase rectifiers connected to receive the first-phase output of said two-phase alternator and also include a second set of full-wave second phase rectifiers connected to receive the second phase output of said two-phase alternator.

6. An engine-driven-alternator individual-wheel motorized electric propulsion system, according to claim 1, wherein means is provided for dividing the alternating current output into positive and negative polarity half waves, and wherein means is provided for suppressing the half waves of one polarity corresponding to forward motor driving operation and retaining the half waves of the opposite polarity corresponding to rearward motor driving operation whereby to effect selective backing of the vehicle.

7. An engine-driven-alternator individual-wheel-motorized electric propulsion system, according to claim 1, wherein there is provided a second set of full wave rectifiers with one such second set rectifier having an input connected electrically to each stepping motor to receive alternating current therefrom during vehicle speed braking retardation with said stepping motors driven as alternators by their respective vehicle wheels, and with said second set rectifier having an output connected to said storage battery in recharging relationship therewith, and wherein said braking retardation means is provided for diverting the output of said engine-driven alternator to said gate control rectifiers and thense to said storage battery.

8. An engine-driven-alternator individual-wheel motorized electric propulsion system, according to claim 1, wherein there is provided a storage battery charging monitor electrically connected in engine speed regulating relationship between the engine and said storage battery for reducing the speed of said engine and consequently reducing the corresponding output of said alternator in response to the indication by said monitor of said storage battery having attained a fully-charged condition.

9. An engine-driven-alternator individual-wheel-motorized electric propulsion system, according to claim 1, wherein said engine is an internal combustion engine.

10. An engine-driven-alternator individual-wheel-motorized electric propulsion system, according to claim 1, wherein said engine is an expansive fluid turbine.

* * * * *